UNITED STATES PATENT OFFICE.

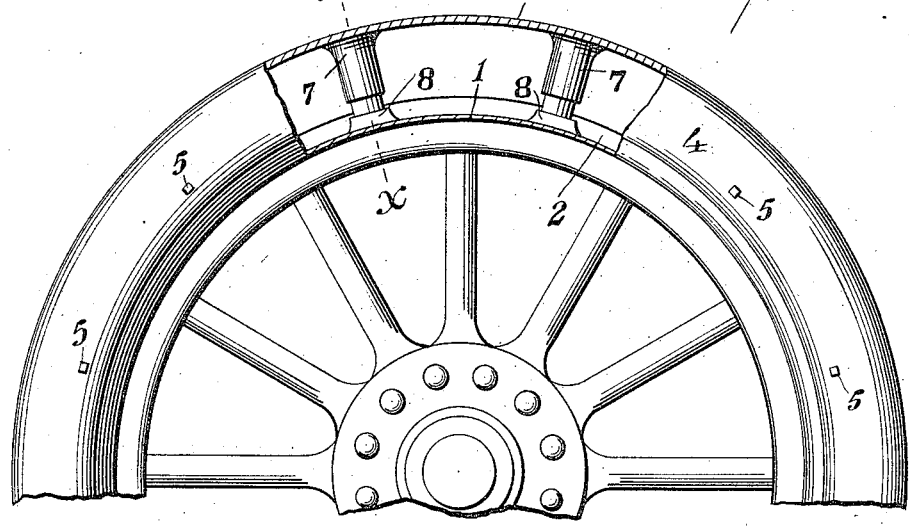
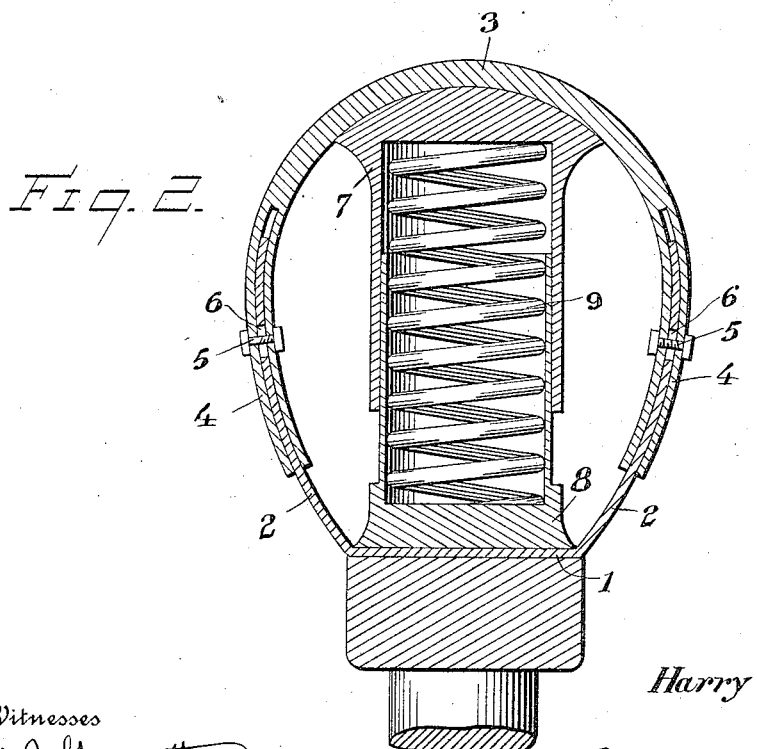

HARRY M. FRANK, OF PULASKI, IOWA.

SPRING-TIRE.

1,069,778. Specification of Letters Patent. Patented Aug. 12, 1913.

Application filed November 2, 1911. Serial No. 658,149.

*To all whom it may concern:*

Be it known that I, HARRY M. FRANK, a citizen of the United States, residing at Pulaski, in the county of Davis and State of Iowa, have invented new and useful Improvements in Spring-Tires, of which the following is a specification.

This invention provides a tire for vehicle wheels designed chiefly for replacing the ordinary pneumatic tire and which possesses a degree of resiliency to overcome shock, thereby preventing the mechanism of automobiles from being subjected to severe shock and at the same time rendering travel comfortable to the passenger or occupant of a vehicle equipped with tires embodying the invention.

The invention contemplates a metal tire comprising elements constructed and combined in a novel manner to admit of relative movement, cushioning devices being interposed between the members of the tire for sustaining the load and absorbing shock and vibration, the tire being of such formation as to enable it to be readily fitted to any make, size or variety of vehicle wheel.

The invention consists of the novel features, details of construction and combination of parts, which hereinafter will be more particularly set forth, illustrated in the accompanying drawing, and pointed out in the appended claim.

Referring to the drawing, forming a part of the specification, Figure 1 is a side view of a portion of a vehicle wheel provided with a tire embodying the invention, a part of the tire being in section. Fig. 2 is a section on the line *x—x* of Fig. 1.

Corresponding and like parts are referred to in the following description, and indicated in both views of the drawing, by the same reference characters.

The tire comprises relatively inner and outer members, the inner member being stationary and the outer member movable and held pressed outwardly by means of interposed cushioning devices. The inner member consists of a base portion 1 and side portions 2 and these parts 1 and 2 may be formed in any manner preferably as parts of a single strip bent into the shape substantially as shown. The base portion 1 is in the shape of a band and is adapted to encircle the rim of the wheel and may be secured thereto in any manner. The side portions 2 consist of flanges which are preferably curved, thereby enabling the tire in its completed form to approximate the outline of the ordinary pneumatic tire in cross section. The outer member of the tire comprises a tread portion 3 and side portions 4. The outer portion of the tire is approximately of U shape, the side portions 4 curving to correspond with the curvature of the side portions 2. Each of the side portions 4 consists of an inner and an outer layer between which the side portion 2 of the inner member is received. Bolts or fastenings 5 pass through registering openings formed in the overlapping portions 2 and 4 of the parts of the tire. The openings 6 formed in the side portions 2 are enlarged, thereby admitting of the outer member of the tire having a radial and a circumferential movement. The tread portion 3 of the outer member of the tire may be of any construction commonly employed in the manufacture of pneumatic cushion or other type of tires so as to resist wear and prevent slipping or skidding. It is preferred to make the tread portion of the tire thicker than the side portion to secure a rigid tread which will resist the bending action of stones or like obstructions in the path of the tire when the same is in service. The side portions 2 and 4 of the members of the tire are flexible to admit of their yielding so as to prevent binding. The parts 2 and 4 fit sufficiently close to prevent dust or moisture from passing into the space of the tire.

Sockets 7 are placed against the inner side of the outer member of the tire. Other sockets 8 are secured to the inner side of the other member of the tire. The sockets 7 and 8 have their base portions extended to obtain a broad bearing upon the supporting parts, whereas the outer portions of the sockets are made tapering. Cushioning devices 9 are interposed between the inner and outer members of the tire and are preferably arranged between the sockets 7 and 8 and consist of expansible helical springs which have their end portions fitted in the respective sockets 7 and 8. The cushioning devices or springs 9 press the outer portion of the tire outward. The inner or opposing ends of the sockets constitute stops to limit the yielding of the outer portion of the tire, thereby preventing overstraining thereof.

It will be understood that the tire by reason of its peculiar construction may replace the ordinary pneumatic tire and is adapted to be fitted to the rim of any vehicle wheel and when in position may be secured by suitable fastening means such as bolts passing through the rim of the wheel and the base portion 1 of the tire. It is also observed that the tire in general appearance resembles the ordinary pneumatic tire and presents a broad tread which is essential to easy riding, particularly upon sandy roads and surfaces having soft spots. The outward curvature of the side members 2 and 4 enables the same to bulge outwardly when the tire is compressed and the flexibility of these parts obviates binding and insures an easy movement of the outer portion of the tire.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claim appended hereto.

Having thus described the invention what is claimed as new, is:—

A spring tire comprising inner and outer complemental members each embodying outwardly curved flexible sides which overlap, the side portions of the outer member comprising integral spaced portions which embrace the side portions of the inner member, fastening means between the side portions of the two members, the openings in the side portions of the inner member being enlarged to admit of the fastenings having play therein, and cushioning devices between the two members of the tire.

In testimony whereof I affix my signature in presence of two witnesses.

HARRY M. FRANK.

Witnesses:
JOSEPH W. RUGLES,
CLAUDE A. POWER.

---

Copies of this patent may be obtained for five cents each, by addressing the "Commissioner of Patents, Washington, D. C."